(12) United States Patent
Frost et al.

(10) Patent No.: US 11,802,811 B2
(45) Date of Patent: Oct. 31, 2023

(54) BELT TENSIONING MONITORING DEVICE

(71) Applicant: Aktiebolaget SKF, Gothenburg (SE)

(72) Inventors: Thomas Frost, Svanesund (SE);
Andreas Karlsson, San Sebastián de los Reyes (ES)

(73) Assignee: Aktiebolaget SKF, Gothenburg (SE)

( * ) Notice: Subject to any disclaimer, the term of this patent is extended or adjusted under 35 U.S.C. 154(b) by 14 days.

(21) Appl. No.: 17/200,810

(22) Filed: Mar. 13, 2021

(65) Prior Publication Data

US 2021/0372883 A1  Dec. 2, 2021

(30) Foreign Application Priority Data

May 26, 2020 (EP) .................................... 20380018

(51) Int. Cl.
*G01M 13/023* (2019.01)
*G01L 5/105* (2020.01)

(52) U.S. Cl.
CPC ........... *G01M 13/023* (2013.01); *G01L 5/105* (2013.01)

(58) Field of Classification Search
CPC .............................. G01L 5/105; G01M 13/023
See application file for complete search history.

(56) References Cited

U.S. PATENT DOCUMENTS

| | | | |
|---|---|---|---|
| 4,348,811 A * | 9/1982 | Brand | G01B 7/02 33/712 |
| 4,480,487 A * | 11/1984 | Kunzfeld | G01L 5/04 73/862.453 |
| 4,578,050 A * | 3/1986 | Takano | F16H 61/6625 474/46 |
| 4,634,404 A * | 1/1987 | Takano | F16H 61/66236 477/44 |
| 5,019,017 A | 5/1991 | Monch | |
| 5,069,086 A | 12/1991 | Murano et al. | |
| 5,518,457 A | 5/1996 | Seki et al. | |
| 5,643,116 A | 7/1997 | Genzel et al. | |
| 5,698,796 A * | 12/1997 | Hirano | G01L 5/042 73/160 |
| 5,871,411 A | 2/1999 | Senger et al. | |
| 5,877,431 A * | 3/1999 | Hirano | G01H 13/00 73/862.41 |
| 6,524,210 B1 | 2/2003 | Vorndran | |
| 6,602,160 B2 | 8/2003 | Tsutsui | |
| 6,749,530 B2 | 6/2004 | Okano et al. | |
| 7,666,110 B2 | 2/2010 | Iwatsuki et al. | |
| 7,686,715 B2 | 3/2010 | Carlson et al. | |
| 7,905,346 B2 | 3/2011 | Enomoto | |
| 8,460,137 B2 | 6/2013 | Kajigaya et al. | |
| 8,798,877 B2 | 8/2014 | Ayabe et al. | |

(Continued)

OTHER PUBLICATIONS https://knowledge.autodesk.com/support/inventor-products/learn-explore/caas/CloudHelp/cloudhelp/2016/ENU/Inventor-Help/files/GUID-3DB83F43-A865-4DD4-AE34-1860CFE68F79-htm.html.

*Primary Examiner* — Eric S. McCall
(74) *Attorney, Agent, or Firm* — GARCIA-ZAMOR INTELLECTUAL PROPERTY LAW, LLC; Ruy Garcia-Zamor

(57) ABSTRACT

Belt tensioning monitoring device for monitoring the belt tensioning of a belt of a belt drive system having a driving pulley and a driven pulley rotated by the driving pulley. The belt tensioning monitoring device is configured to determine the belt slip effect with at least one mark provided on the belt and a sensor configured to detect the mark and to send a signal to an electronic control unit.

12 Claims, 1 Drawing Sheet

(56) References Cited

U.S. PATENT DOCUMENTS

| | | | |
|---|---|---|---|
| 9,228,909 B1* | 1/2016 | Rembisz | G01L 3/14 |
| 2002/0142870 A1 | 10/2002 | Okano et al. | |
| 2003/0033864 A1* | 2/2003 | Rankin | B25B 23/14 |
| | | | 73/114.01 |
| 2003/0199349 A1* | 10/2003 | Sands | B65G 39/16 |
| | | | 198/806 |
| 2004/0063529 A1 | 4/2004 | Mare et al. | |
| 2004/0066521 A1* | 4/2004 | Swab | G01L 5/042 |
| | | | 356/614 |
| 2005/0090340 A1 | 4/2005 | Wang et al. | |
| 2005/0277502 A1 | 12/2005 | Wood | |
| 2006/0183581 A1 | 8/2006 | Iwatsuki et al. | |
| 2006/0240922 A1* | 10/2006 | Pendergrass | F16H 7/1281 |
| | | | 474/102 |
| 2007/0155559 A1* | 7/2007 | Horst | F16H 19/005 |
| | | | 474/134 |
| 2007/0207884 A1 | 9/2007 | Unno | |
| 2009/0298625 A1 | 12/2009 | Kodama et al. | |
| 2010/0131232 A1* | 5/2010 | Taylor | F02B 77/081 |
| | | | 702/147 |
| 2011/0015012 A1 | 1/2011 | Kajigaya et al. | |
| 2011/0092324 A1* | 4/2011 | Roby | F16H 63/062 |
| | | | 474/8 |
| 2011/0316525 A1 | 12/2011 | Lynn | |
| 2013/0100503 A1* | 4/2013 | Beselt | H04N 1/128 |
| | | | 358/474 |
| 2013/0172137 A1 | 7/2013 | Antchak et al. | |
| 2014/0309882 A1 | 10/2014 | Antchak et al. | |
| 2015/0057117 A1 | 2/2015 | Antchak et al. | |
| 2015/0260264 A1* | 9/2015 | Petridis | F02N 19/00 |
| | | | 474/101 |
| 2016/0007526 A1* | 1/2016 | Greulich | A01D 69/08 |
| | | | 56/14.7 |
| 2016/0178035 A1 | 6/2016 | Tay | |
| 2016/0186846 A1 | 6/2016 | Kidokoro et al. | |
| 2016/0230886 A1* | 8/2016 | Sasaki | F16H 61/662 |
| 2017/0205312 A1* | 7/2017 | Heyerman | G01M 15/14 |
| 2018/0023978 A1 | 1/2018 | Yoshiya | |
| 2018/0119790 A1* | 5/2018 | Kanduri | F16H 57/01 |
| 2021/0101753 A1* | 4/2021 | Kataria | B65G 23/44 |
| 2021/0270277 A1* | 9/2021 | Scoville | F16H 57/0416 |
| 2021/0372873 A1* | 12/2021 | Karlsson | G01L 5/105 |

\* cited by examiner

BELT TENSIONING MONITORING DEVICE

CROSS-REFERENCE TO RELATED APPLICATION(S)

This application claims priority to European Patent Application no. 20380018.0, filed Mar. 26, 2020, the contents of which is fully incorporated herein by reference.

TECHNICAL FIELD OF THE INVENTION

The present invention relates to the field of condition monitoring devices, and in particular to condition monitoring of belt tensioning.

BACKGROUND OF THE INVENTION

Condition monitoring devices allow for the monitoring of the condition of a system without the need for manual inspection. These devices may be particularly advantageous in remote locations or locations which are difficult and/or dangerous to access.

Insufficient belt tension results in inadequate power transmission, reduced efficiency, and premature belt damage due to belt slip.

Excessive belt tension leads to high specific surface pressure, a risk of cross flexing, increased flexing stress and increased strain on the tension members with consequent premature fractures and elongation.

The correct belt tension is just enough tension to keep the belt from slipping under normal load conditions.

Belt slip is generally defined in a built-in slip table according to the speed of the driven pulley.

The belt slip occurs on the driver pulley so the speed of all driven pulleys is influenced by the same slip.

Usual belt slip magnitude is comprised between 1% and 2% what results in a belt slip effect comprised between 0.01 and 0.02.

There is a need to estimate if a belt of a belt drive system is correctly tensioned meanwhile running.

SUMMARY OF THE INVENTION

The aim of the present invention is consequently to provide an improved belt condition monitoring device.

It is a particular object of the present invention to provide a belt tensioning monitoring device for monitoring the belt tensioning of a belt of a belt drive system comprising a driving pulley and a driven pulley rotated by the driving pulley thanks to the belt.

The belt tensioning monitoring device is configured to determine the belt slip effect with at least one mark provided on the belt and a sensor configured to detect the mark and to send a signal to an electronic control unit.

For example, the mark is a magnetized area such as a magnet or a magnetized rubber fixed on a surface of the belt, or a magnetic powder embedded in or on the belt, and the sensor is a Hall effect sensor.

Alternatively, the mark is an optical mark such as reflective area or a tape, and the sensor is an optical sensor.

According to an embodiment, the belt tensioning device comprises a second mark provided on the belt, the sensor being configured to detect the second mark.

For example, the second mark is a magnetized area such as a magnet or a magnetized rubber fixed on a surface of the belt, or a magnetic powder embedded in or on the belt.

Alternatively, the second mark is an optical mark such as reflective area or a tape.

According to another embodiment, the belt comprises a plurality of marks.

According to another embodiment, the marks of the belt are of the same type, for instance of the magnetic type or the optical type.

According to another embodiment, the belt tensioning device comprises at least one mark provided on a surface of one of the pulleys and a second sensor configured to detect the at least one mark and to send a speed signal to the electronic control unit.

The least one mark may be a reflective mark and the second sensor may be an optical sensor, such as, for example, an infrared sensor.

The at least one mark may be a magnet or a magnetized rubber fixed on a surface of the pulley and the second sensor may be a hall effect sensor.

According to another aspect, the invention concerns a belt drive system comprising a belt, a driving pulley, a driven pulley rotated by the driving pulley thanks to the belt and a belt tensioning monitoring device according to any of the preceding claims.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
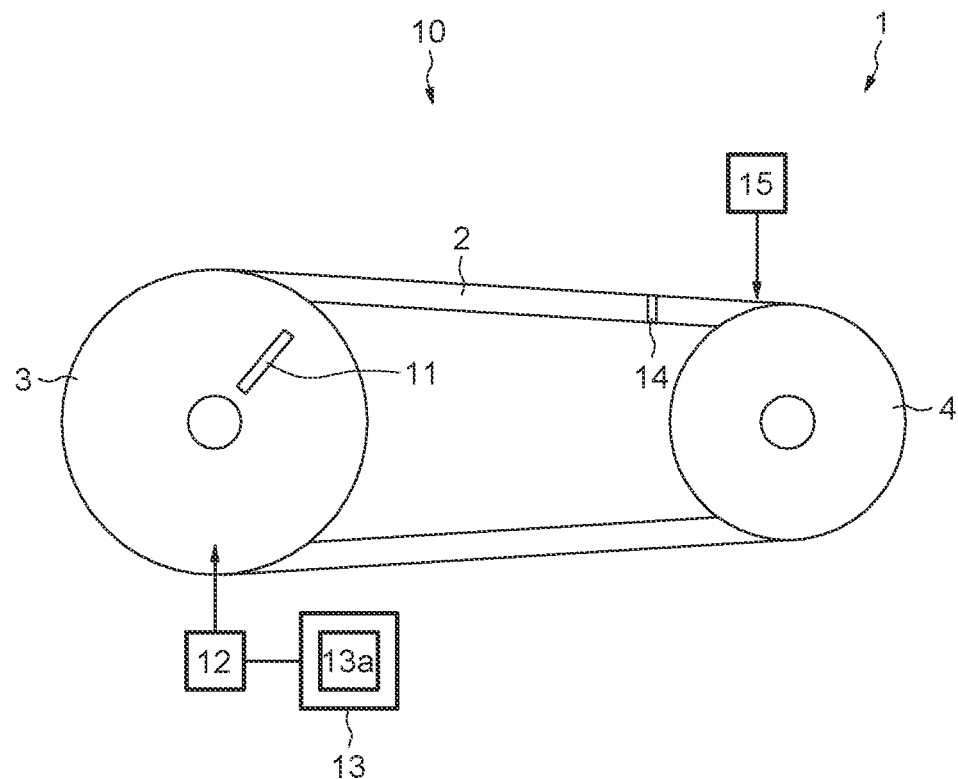
FIG. 1 is a schematic view of a belt drive system comprising a belt tensioning monitoring device according to an embodiment of the invention.

Referring to FIG. 1, which illustrates an embodiment of a belt tensioning monitoring device 10 for monitoring the belt tensioning of a belt 2 of a belt drive system 1 comprising a driving pulley 3 and a driven pulley 4 rotated by the driving pulley 3 thanks to the belt 2. For example, the belt 2 is a V-shaped belt.

The belt tensioning monitoring device 10 comprises a first mark 11 provided on one of the pulleys, for example the driving pulley 3 and a first sensor 12 configured to detect the first mark 11.

The first mark 11 may be a reflective mark or tape and the first sensor 12 may be an optical sensor, such as an infrared sensor.

Alternatively, the first mark 11 may be a magnet and the first sensor 12 may be a hall effect sensor for measuring the magnitude of a magnetic field generated by the magnet when passing through the sensor 12.

The first sensor 12 is configured to send the signal of rotational speed of the pulley 3 to an electronic control unit 13 of the belt tensioning monitoring device 10.

The belt tensioning monitoring device 10 comprises a second mark 14 provided on the belt 2 The second mark 14 can be of the magnetic type or a magnetized area, such as for example a magnet or a magnetized rubber fixed on the surface of the belt or a magnetic powder embedded in or on the belt. Alternatively, the second mark 14 can be an optical mark such as a reflective area or a tape.

The belt tensioning monitoring device 10 further comprises a second sensor 15 configured to detect the second mark 14 and to send the signal of the belt frequency to the electronic control unit 13 of the belt tensioning monitoring device 10.

In the case where the second mark 14 is a magnetic mark, the second sensor 15 is preferably a hall effect sensor for measuring the magnitude of a magnetic field generated by the second mark 14 when passing through the second sensor 15.

In the case where the second mark 14 is an optical mark, the second sensor 15 is preferably an optical sensor.

The electronic control unit 13 of the belt tensioning monitoring device 10 comprises an estimation module 13a configured to determine the slip effect of the belt 2 according to the speed of the pulley 12 and to the frequency of the belt.

Figure 2:
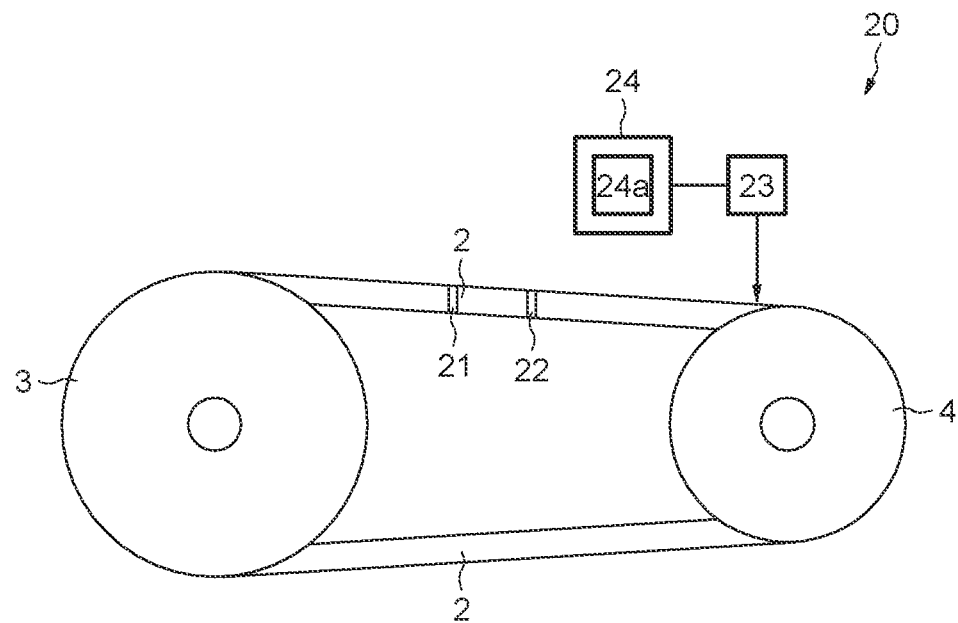
FIG. 2 is a schematic view of a belt drive system comprising a belt tensioning monitoring device according to another embodiment of the invention.

Referring now to FIG. 2, which illustrates an embodiment of a belt tensioning monitoring device 20 for monitoring the belt tensioning of a belt 2 of a belt drive system comprising a driving pulley 3 and a driven pulley 4 rotated by the driving pulley 3 thanks to the belt 2. For example, the belt 2 is a V-shaped belt.

The belt tensioning monitoring device 20 comprises a first mark 21 provided on the belt 2, a second mark 22 provided on the belt 2 at a distance from the first mark and a first sensor 23 configured to detect the marks 21, 22.

Alternatively, and more generally, the belt may comprise a plurality of marks capable of being detected by the sensor 23. Advantageously, the plurality of marks is of the same type, for instance of the magnetic type or the optical type.

The marks 21, 22 on the belt may be of the magnetic type, that is a magnetized area such as a magnet or a magnetized rubber fixed on the surface of the belt or magnetized powder embedded in or on the belt, and the first sensor 23 may be a hall effect sensor for measuring the magnitude of a magnetic field generated by the magnet 21, 22 when passing through the sensor 23.

Alternatively, the marks on the belt may be of the optical type, for instance reflective marks or tapes, and the first sensor 23 an optical sensor.

Still referring to FIG. 2, the first sensor 23 is configured to send the signal of position of the marks of the belt to determine the belt frequency to the electronic control unit 24 of the belt tensioning monitoring device 20.

The electronic control unit 24 of the belt tensioning monitoring device 20 comprises an estimation module 24a configured to determine the slip effect of the belt 2 according to the measured distance, it is possible to know the degree of tensioning of the belt.

In a further embodiment of the invention, the belt tensioning monitoring device comprises a first mark provided on one of the driving and driven pulleys and a first associated sensor for reading the first mark, and a plurality of marks located on or in the belt and a second associated sensor for reading the plurality of belt marks.

In the embodiments of the invention where the belt comprises at least two marks, the analysis of the signals generated by the sensor which reads the belt marks can also be used to determine the elongation and the tension of the belt.

Thanks to the invention, slip effect of the belt may be efficiently estimated and thus the belt tensioning may be characterized.

The user may thus know if the tension of the belt is correct and adjust its tension or replace the belt if necessary.

It is to be understood for the present invention that belt means a single strand belt or a multibelt, and that the belt is for instance of the groove type or the V type, but not necessarily.

The invention claimed is:

1. A belt tensioning monitoring device for monitoring a belt tensioning of a belt of a belt drive system comprising:
the belt having a first belt mark thereon,
a driving pulley engaged with the belt,
a driven pulley engaged with the belt such that the driven pulley can be rotated by the driving pulley,
a pulley mark, one of the driving pulley and the driven pulley comprising the pulley mark,
an electronic control unit,
a first sensor in communication with the electronic control unit and positioned relative to the one of the driving pulley and the driven pulley so as to detect the pulley mark when it rotates past the first sensor, and
a second sensor in communication with the electronic control unit and positioned relative to the belt such as to detect the first belt mark when it passes the second sensor,
the electronic control unit being configured to receive data from the first sensor and the second sensor and to use the data to determine a belt slip effect between the belt and the one of the driving pulley and the driven pulley,
wherein the first belt mark comprises a magnetized area, the magnetized area is a magnetized rubber that is fixed on a surface of the belt.

2. The belt tensioning monitoring device according to claim 1, wherein the electronic control unit comprises an estimation module, the estimation module configured to determine the belt slip effect.

3. The belt tensioning monitoring device according to claim 1, wherein the pulley mark is a reflective mark and the first sensor is an optical sensor.

4. The belt tensioning monitoring device according to claim 1, wherein the pulley mark is a magnet or a magnetized rubber fixed on a surface of the pulley and the first sensor is a hall effect sensor.

5. The belt tensioning monitoring device according to claim 1, further comprising a second belt mark being provided on the belt, the second sensor being configured to also detect the second belt mark.

6. The belt tensioning monitoring device according to claim 5, wherein the second belt mark is of the same type of the first belt mark.

7. The belt tensioning monitoring device according to claim 5, wherein the second belt mark comprises an optical mark, the optical mark being one of a reflective area or a tape.

8. A belt tensioning monitoring device for monitoring a belt tensioning of a belt of a belt drive system comprising:
the belt having a first belt mark thereon,
a driving pulley engaged with the belt,
a driven pulley engaged with the belt such that the driven pulley can be rotated by the driving pulley,
a pulley mark, one of the driving pulley and the driven pulley comprising the pulley mark,
an electronic control unit,
a first sensor in communication with the electronic control unit and positioned relative to the one of the driving pulley and the driven pulley so as to detect the pulley mark when it rotates past the first sensor, a second sensor in communication with the electronic control unit and positioned relative to the belt such as to detect the first belt mark when it passes the second sensor, the electronic control unit being configured to receive data from the first sensor and the second sensor and to use the data to determine a belt slip effect between the belt and the one of the driving pulley and the driven pulley, and a second belt mark, the second belt mark comprising a magnetized area, the magnetized area is a magnetized rubber that is fixed on a surface of the belt.

9. A belt drive system comprising:
a belt,
a driving pulley engaged with the belt,
a driven pulley engaged with the belt such that the driven pulley can be rotated by the driving pulley, and
a belt tensioning monitoring device for monitoring a belt tensioning of the belt of the belt drive system comprising:
a first belt mark provided on the belt,
a pulley mark, one of the driving pulley and the driven pulley comprising the pulley mark,
an electronic control unit,
a first sensor in communication with the electronic control unit and positioned relative to the one of the driving pulley and the driven pulley so as to detect the pulley mark when it rotates past the first sensor, and
a second sensor in communication with the electronic control unit and positioned relative to the belt such as to detect the first belt mark when it passes the second sensor, the electronic control unit being configured to receive data from the first sensor and the second sensor and to use the data to determine a belt slip effect between the belt and the one of the driving pulley and the driven pulley,
wherein the first belt mark comprises a magnetized area, the magnetized area being a magnetic powder embedded in the belt, and the second sensor is a hall effect sensor.

10. A belt tensioning monitoring device for monitoring a belt tensioning of a belt of a belt drive system comprising:
the belt having a first belt mark thereon,
a driving pulley engaged with the belt,
a driven pulley engaged with the belt such that the driven pulley can be rotated by the driving pulley,
a pulley mark, one of the driving pulley and the driven pulley comprising the pulley mark,
an electronic control unit,
a first sensor in communication with the electronic control unit and positioned relative to the one of the driving pulley and the driven pulley such as to detect the pulley mark when it rotates past the first sensor, and
a second sensor in communication with the electronic control unit and positioned relative to the belt such as to detect the first belt mark when it passes by the second sensor,
wherein the first belt mark comprises a magnetized area, the magnetized area being a magnetic powder embedded in the belt, and the second sensor is a hall effect sensor, and
wherein the pulley mark comprises an optical mark.

11. The belt tensioning monitoring device of claim 10, wherein the optical mark comprises one of a reflective area or a tape and a corresponding sensor is an optical sensor.

12. The belt tensioning monitoring device of claim 11, wherein the corresponding sensor is one of the first sensor and the second sensor that corresponds to the other of the first belt mark and the pulley mark with the optical mark.

* * * * *